US008504525B2

(12) United States Patent
Loi et al.

(10) Patent No.: US 8,504,525 B2
(45) Date of Patent: Aug. 6, 2013

(54) DATA MANAGEMENT OF AGGREGRATED DEVICES THROUGH A TELEVISION PLATFORM

(75) Inventors: Daria Loi, Portland, OR (US); Sasanka Prabhala, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 12/319,002

(22) Filed: Dec. 31, 2008

(65) Prior Publication Data

US 2010/0169279 A1 Jul. 1, 2010

(51) Int. Cl.
*G06F 17/30* (2006.01)

(52) U.S. Cl.
USPC ............................................... 707/640

(58) Field of Classification Search
USPC .................. 707/999.204, 640, 648, 650, 652, 707/674; 709/219, 231
See application file for complete search history.

(56) References Cited

U.S. PATENT DOCUMENTS

| | | | |
|---|---|---|---|
| 6,188,887 B1 * | 2/2001 | Joong et al. ................ 455/417 |
| 6,473,854 B1 * | 10/2002 | Fleming, III .................. 713/1 |
| 7,197,634 B2 * | 3/2007 | Kruger et al. ................. 713/1 |
| 7,209,734 B2 * | 4/2007 | Maes ...................... 455/414.1 |
| 7,250,854 B2 * | 7/2007 | Rezvani et al. ............. 340/506 |
| 2003/0018714 A1 * | 1/2003 | Mikhailov et al. ........... 709/203 |
| 2003/0035522 A1 * | 2/2003 | Mansfield ................. 379/90.01 |
| 2003/0097461 A1 * | 5/2003 | Barham et al. .............. 709/235 |
| 2003/0234811 A1 * | 12/2003 | Kim ............................ 345/744 |
| 2004/0213273 A1 * | 10/2004 | Ma .............................. 370/401 |
| 2005/0021915 A1 * | 1/2005 | Lowe et al. .................. 711/154 |
| 2005/0198545 A1 * | 9/2005 | Wieck et al. ................ 713/323 |
| 2006/0085817 A1 * | 4/2006 | Kim et al. ..................... 725/34 |
| 2006/0155723 A1 * | 7/2006 | Kumar et al. ............... 707/100 |
| 2006/0159109 A1 * | 7/2006 | Lamkin et al. .............. 370/401 |
| 2006/0174102 A1 * | 8/2006 | Smith et al. ................. 713/150 |
| 2006/0187858 A1 * | 8/2006 | Kenichi et al. ............. 370/254 |
| 2006/0253451 A1 * | 11/2006 | Van De Sluis et al. ........ 707/10 |
| 2007/0098019 A1 * | 5/2007 | Kelly et al. ................. 370/493 |
| 2007/0133953 A1 * | 6/2007 | Fontijn et al. ............... 386/126 |
| 2007/0189301 A1 * | 8/2007 | Kiss et al. ................. 370/395.2 |
| 2007/0204104 A1 * | 8/2007 | Wan et al. ................... 711/114 |
| 2007/0245048 A1 * | 10/2007 | Mesut et al. ................ 710/105 |
| 2007/0291761 A1 * | 12/2007 | Kauniskangas et al. ... 370/395.2 |
| 2008/0008088 A1 * | 1/2008 | Nagarajan et al. ........... 370/220 |
| 2008/0034033 A1 * | 2/2008 | Agrawal ..................... 709/203 |

(Continued)

OTHER PUBLICATIONS

Goth, Greg, "Redefining the Server as Home Networks Emerge", IEEE Internet Computing, vol. 12, Issue 2, Mar./Apr. 2008, pp. 7-9.*

(Continued)

*Primary Examiner* — Thu-Nguyet Le
(74) *Attorney, Agent, or Firm* — International IP Law Group, P.L.L.C.

(57) ABSTRACT

An apparatus and method are disclosed. In one embodiment apparatus includes a media aggregation backup unit that can receive a request to perform a backup of a set of media files stored within media storage devices coupled to a home network. The media aggregation backup unit can send information to a remote server, coupled to the Internet that identifies the media storage devices coupled to the home network to the remote server. Also, the media aggregation backup unit can send information to the media storage devices to provide the media storage devices the identity and location of the remote server.

20 Claims, 3 Drawing Sheets

(56) References Cited

U.S. PATENT DOCUMENTS

| | | | |
|---|---|---|---|
| 2008/0077650 A1* | 3/2008 | Jared | 709/203 |
| 2008/0270797 A1* | 10/2008 | Thomas et al. | 713/171 |
| 2008/0279161 A1* | 11/2008 | Stirbu et al. | 370/338 |
| 2009/0058618 A1* | 3/2009 | Gopalan et al. | 340/10.51 |
| 2009/0106388 A1* | 4/2009 | Iwami et al. | 709/217 |
| 2009/0106407 A1* | 4/2009 | Kodama et al. | 709/223 |
| 2009/0144341 A1* | 6/2009 | Hauck et al. | 707/202 |
| 2009/0160694 A1* | 6/2009 | Di Flora | 341/176 |
| 2009/0282470 A1* | 11/2009 | Yang et al. | 726/12 |
| 2010/0131613 A1* | 5/2010 | Jonsson et al. | 709/218 |
| 2010/0165957 A1* | 7/2010 | Hegde et al. | 370/338 |
| 2010/0205152 A1* | 8/2010 | Ansari et al. | 707/654 |

OTHER PUBLICATIONS

Lee, Tae-Dong, et al., "Service-Oriented Home Network Middleware Based on OSGA", ICCSA 2005, LNCS 3480, Springer-Verlag, Berlin, Germany, © 2005, pp. 601-608.*

Edney, Andrew, "Chapter 1: What Is Windows Home Server?", Window's Home Server User's Guide, Apress, Berkeley, CA, © 2007, pp. 1-11.*

Edney, Andrew, "Chapter 7: Home Computer Backups and Restores", Window's Home Server User's Guide, Apress, Berkeley, CA, © 2007, pp. 137-178.*

Edney, Andrew, "Chapter 10: Media Streaming", Window's Home Server User's Guide, Apress, Berkeley, CA, © 2007, pp. 213-227.*

Laplante, Phillip A., (Editor-in-Chief), Dictionary of Computer, Science, Engineering, and Technology, CRC Press, New York, NY, © 2001, p. 530.*

Bell, Gordon, et al., "A Call for the Home Media Network", Communications f the ACM, vol. 45, No. 7, Jul. 2002, pp. 71-75.*

Sridharan, Baskar, et al., "Digital Device Manuals for the Management of ConnectedSpaces", IEEE Communications Magazine, Aug. 2002, pp. 78-85.*

Imai, Naoki, et al., "Multi-Device seamless Service by User-Oriented session in All-IP Network", ICC 2007, Glasgow, Scotland, Jun. 24-28, 2007, pp. 1929-1934.*

* cited by examiner

DATA MANAGEMENT OF AGGREGRATED DEVICES THROUGH A TELEVISION PLATFORM

FIELD OF THE INVENTION

The invention relates to backing up media files stored among a group of devices in a local network.

BACKGROUND OF THE INVENTION

Users have an increasing large amount of connected devices in their homes and businesses. The connected devices have media and other files where users are constantly faced with issues related to storage and backup. As more types of devices that store data enter these environments, it generally requires more overhead in the form of more backup sessions on an ongoing basis to control and take care of this data across the wide range of devices.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of an apparatus and method to provide aggregated backup services for one or more media storage devices are disclosed.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
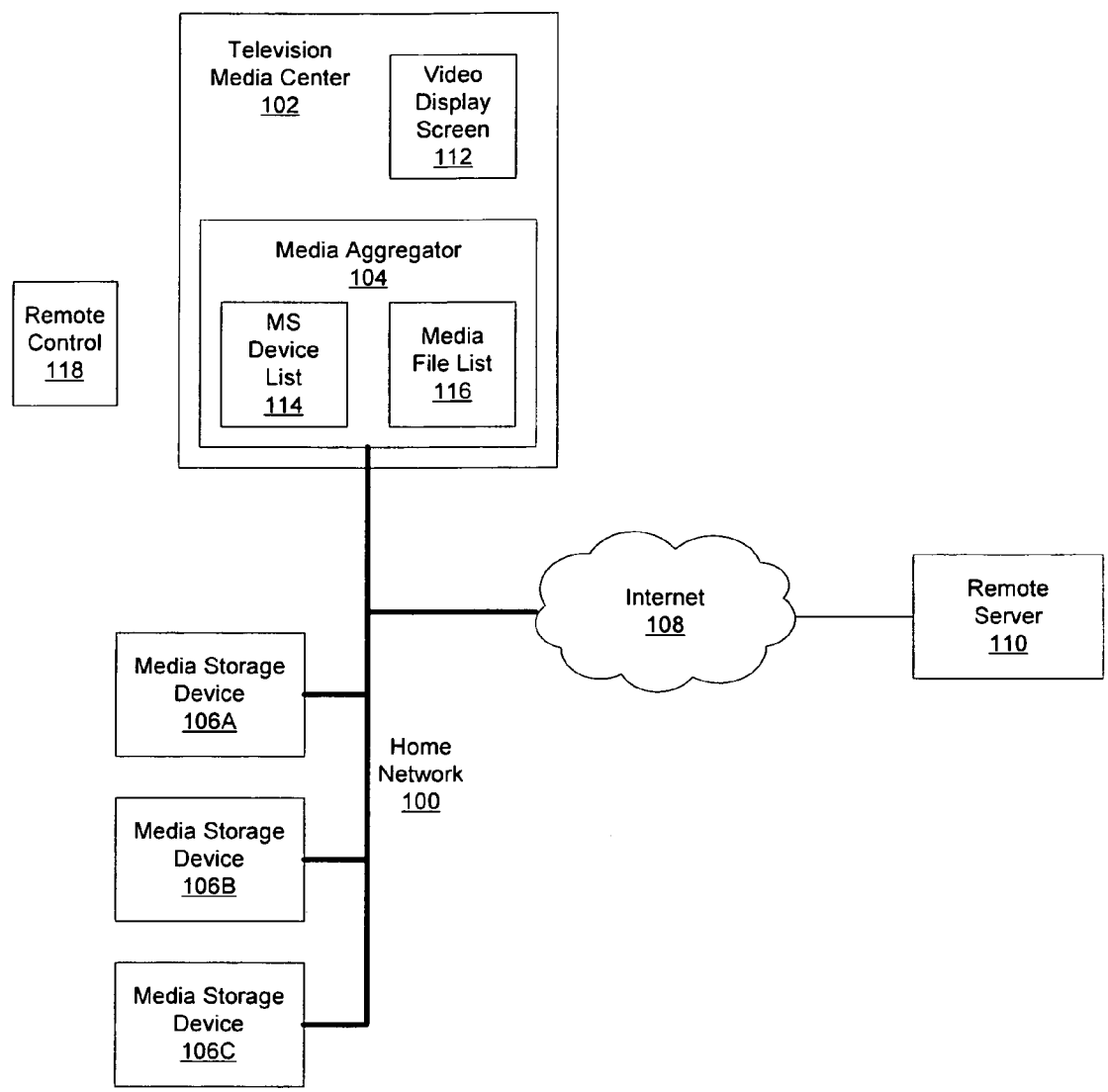
FIG. 1 illustrates a number of devices that may be located in a home, business, or other localized building that would benefit from aggregated backup services for media storage devices.

FIG. 1 illustrates a number of devices that may be located in a home, business, or other localized building that would benefit from aggregated backup services for media storage devices. In some embodiments, the environment the device is utilized in is in a home. People generally have multiple devices throughout or near their homes which store media. Media may include video files, audio files, text-based files (such as electronic books) as well as any other potential forms. As listed, each form of media is generally stored in files, though other types of data structures may be utilized. Devices in and around a home or place of business that may store media include a digital video recorder, a cellular phone, a handheld computing device such as an electronic organizer or portable video game system, laptop, desktop, workstation, and server computers, digital video disk (DVD) players, set top boxes, video game consoles, handheld digital music and video players, digital cameras and camcorders, and even computing devices integrated into automobiles parked near the home or business. Any of these devices may be communicatively coupled to each other through a home or business network, such as home network 100. This network can be a wireless network (e.g. an IEEE 802.11-based wireless network), a wired network (e.g. an Ethernet-based network), or a combination of both using one or more routers or switches that may translate wired protocols to wireless protocols and vice versa.

In many embodiments, there is a centralized television media center 102 in the house. Generally this television media center 102 would be comprised of the main TV in a TV room or elsewhere, in which movies, videos, cable, satellite, and broadcast networks are watched. In other embodiments, there may be more than one television media center in the house and thus one of the group of television media centers may be chosen to be a central media outlet or more than one center may share those duties. A media aggregator device 104 may be located locally to the television media center 102. The media aggregator 104 may be located within the television in the center, in a set top box, in a digital video recorder, or discretely in its own form factor box among the devices coupled together at the television media center 102. The media aggregator 104 is coupled to the home network 100 in many embodiments. This coupling may be wired or using a wireless connection.

In many embodiments, a group of media storage devices, such a combination of some or all of the devices listed above that store media may also be coupled to the home network. For example, in FIG. 1, media storage devices 106A, 106B, and 106C are all coupled to the same home network 100 that the media aggregator is coupled to as well. Additionally, in many embodiments, the home network is further coupled to a larger area network, such as the Internet 108. In other embodiments, the home network 100 is indirectly coupled to the Internet 108 through a digital subscriber line (DSL) connection, a cable modem connection, or another high speed connection to a local Internet provider, where the Internet provider provides a communication link to the Internet in general. In many embodiments, a router or switch is utilized to couple the home network to the Internet, though one is not shown in FIG. 1.

At some remote location (not necessarily in the local vicinity of the home network 100) a remote server is also coupled to the Internet 108.

The media aggregator 104, or another device included within the television media center, may be capable of streaming widget content to a video display screen 112 in the TV media center 102. The widget content, which may include content from the Intel® and Yahoo!® widget channel and/or other widget-based content may allow information related to media stored within one or more of the media storage devices (106A-C) to be displayed on the video display screen 112 in the TV media center 102.

In many embodiments, a user of one or more of the media storage devices present at the home network 100 location and communicatively coupled to the home network 100 may want to back up data presently stored in one or more of the devices. Many times the user may want to back up all devices at once to make sure important files are backed up which at any point could be corrupted, misplaced, or stolen. Instead of painstakingly backing up each device individually, in many embodiments the media aggregator 104 includes logic to assist in backing up media and other files in all devices present on the home network simultaneously.

The remote server 110 may provide backup services to any paying customer. For example, the remote server 110 may store any number of files for a user of the home network 100 for a certain fee. To prepare the devices on the home network 100 for back up services, the media aggregator first creates a list of each of the media storage devices coupled to the network (media storage device list 114). This list may have several components. First, the list may include every media storage device verified as being allowed to have data backed up that the media aggregator 104 is aware of. This component of the list may expand over time. For example, the media aggregator 104 may be capable of seeing any device as it connects to the home network 100. A device may connect to the home network 100 by either physically plugging into a cable in a wired network, or coming within range of a wireless network. For a home-based network, the wireless range is generally not very far (e.g. the wireless network may have a range capable of reaching any location in the home as well as in the yard and driveway around the home).

Each time a device connects to the home network 100, the media aggregator can determine if it has seen the device previously by scanning the list of media devices 114. If the media aggregator 104 is not familiar with the connecting device, the media aggregator 104 may prompt a user of the home network 100 whether to include the new device into the list for future potential back up events.

Another component of the list includes a detection element, which specifies that for every media storage device listed in the list, which ones are currently coupled to the network. A device may not be present for a number of reasons, for example, a cell phone may be one of the devices and the cell phone may be out of range of the home network 100 at any given time. Another example may be that a video game console is a device in the list but the console is not powered on, thus it will not be presently coupled to the network because it lacks power to operate. Therefore, for the entire set of known devices in the list 114, there exists a subset of devices that are presently coupled to the network, the subset may actually include the entire list of devices if every known device is present.

When a new device unfamiliar to the media aggregator 104 connects to the home network 100, the media aggregator can either react to it passively or actively. For example, the media aggregator 100 may prompt a known user of the home network 100 that the new device has communicatively coupled to the network and whether to include it in on the device list 114. The media aggregator may send a message to the new device stating that the user of the new device needs permission of a known user of the home network 100, who could subsequently inform the media aggregator 104 to include the new device in the device list 114. In other embodiments, the media aggregator 104 may be passive and not do anything regarding the new unknown device and assume that a user of the home network 104 will manually inform the media aggregator 104 when any new device is to be included.

The device list therefore includes all known media storage devices and information as to whether each device is presently communicatively coupled to the network. A second list, the media file list 116, may be stored in the media aggregator 104 in many embodiments. The media file list may include a list of media files per device from the device list 114. The media file list may have several components as well.

In some embodiments, the media file list 116 includes certain information for all files stored on each of the known devices in the device list 114. For each file, the media aggregator 104 may include the file name, the file size, and a bit that determines whether that particular file is to be backed up. The entire file is not stored in the media file list 116, just certain file attributes. Some files are more important than others and thus, some files may have a justifiable need to be backed up and others may not, thus, in the embodiments where the media file list has a full list of files, this extra bit of information is determinative as to whether to back up each file during a back up event.

In other embodiments, the media file list 116 does not include information for every file and only has the information for files that have been designated to be backed up. In many embodiments, the media aggregator 104 attains permission per device to store a list of file information. For example, a guest may enter the home and have a personal digital assistant automatically connect to the home network 100. But, the guest may not want his or her files stored within the personal digital assistant to be available to the media aggregator 104. Thus, in many embodiments, there may be a security verification process each time a new device connects to the home network prior to the media aggregator obtaining access to the files stored on the new device.

If a new device enters the network and is verified as being a device that the user wants to have its data backed up, then the media aggregator can add the device to the device list 114 and the information regarding the media files to the media file list 116.

At some point a user of the home network 100 may inform the media aggregator to perform a back up. In some embodiments, the user may utilize a button on a remote control 118 (e.g. "Back up all media now" button) to initiate the back up. In other embodiments, the media aggregator keeps track of the time and automatically performs backups at certain times of the day, week, or month.

There are at least two general processes to back up files. Both processes involve the media aggregator 104 communicating with the remote server 110 across the Internet 108. The media aggregator 104 will inform the remote server 110 that a set of files will be imminently sent to the server. The media aggregator 104 may first send information from the device list 114 regarding the subset of devices that will be providing data for backup purposes. The media aggregator 104 then sends the remote server the list of files that will be backed up, which also may be a subset of the files listed in the media file list 116. The reason that both lists may include a subset of information instead of all of the information in the list is due to the fact that not all media storage devices may be present during the back up process.

In some embodiments, a media storage device will send file data to be backed up directly from the device across the Internet 108 to the remote server 110. In these embodiments, the media aggregator 104 sends the address and security information to the individual media storage devices that do this so the media storage devices can locate and connect directly with the remote server. Additionally, in these embodiments, the remote server utilizes the device list 114 information sent by the media aggregator 104 to be aware of the device address and name information so only the devices presently communicatively coupled to the home network 100 can send data to the remote server and not random devices which may cause a security risk. In other embodiments, a media storage device may stream media through the media aggregator 104 to the remote server 110. In these embodiments, the remote server 110 may just need to verify the authenticity of the media aggregator 104 instead of verifying the authenticity of each media storage device. The embodiments that utilize a media stream of file data from the device through the media aggregator 104 to the remote server 110 may utilize the widget framework within the TV media center for streaming capabilities. The files may be kept in a stream form and just routed through the media aggregator 104 to the remote server 110. Therefore, the media aggregator 104 does not require storage space to store files that are to be sent to the remote server for back up storage. Rather, the media aggregator 104 may be utilized as a media stream routing device.

In yet other embodiments, a combination of the two file sending processes is utilized. In other words, some media storage devices that are communicatively coupled to the home network 100 may stream files to be backed up directly to the remote server 110 while other media storage devices also communicatively coupled to the home network 100 may stream files to the media aggregator 104, which routes the streams to the remote server 110.

In other embodiments not shown, the remote server 114 is actually a home network 100 user's local backup server directly coupled to the home network 100 instead of coupled to the home network 100 through the Internet 108.

Figure 2:
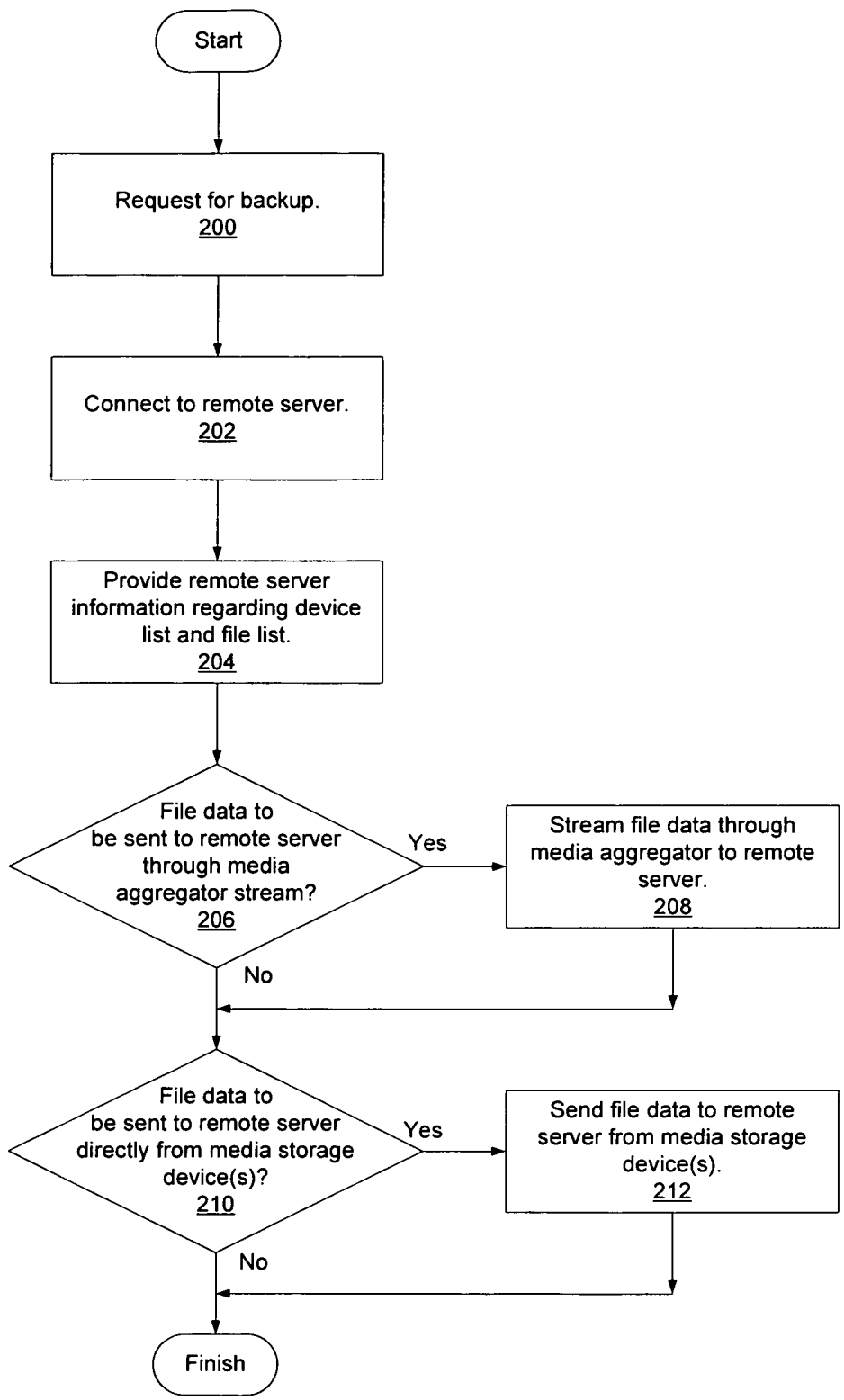
FIG. 2 is a flow diagram of an embodiment of a process to back up media files from one or more media storage devices to a remote server.

FIG. 2 is a flow diagram of an embodiment of a process to back up media files from one or more media storage devices to a remote server. The process is performed by processing logic, which may be hardware, software, or a combination of both hardware and software. The process begins by processing logic receiving a request for a back up of media files (processing block 200). The request may either be received manually from a user or automatically through a timer mechanism.

Next, processing logic connects to a remote server that will be storing back up copies of the media files (processing block 202). Next, processing logic provides the remote server information regarding the device list of devices that will be having media files backed up as well as a list of files to be backed up (processing block 204).

Then processing logic determines per file whether the actual file data will be sent to the remote server through the media aggregator stream architecture or whether the file data will be sent to the remote server directly from the media storage device with the original copy of the file (processing block 206). If the file is to be streamed, then processing logic streams the file data through the media aggregator device to the remote server (processing block 208).

Processing logic then determines whether file data will be sent to the remote server directly from the media storage device (processing block 210). If the file data will be sent directly, then processing logic allows the media storage device to send the file data to the remote server directly (processing block 212). In certain embodiments, the user may have decided against backing up the file or the file may have already been misplaced. In those embodiments, processing logic uses the no branch for both blocks 206 and 210.

Figure 3:
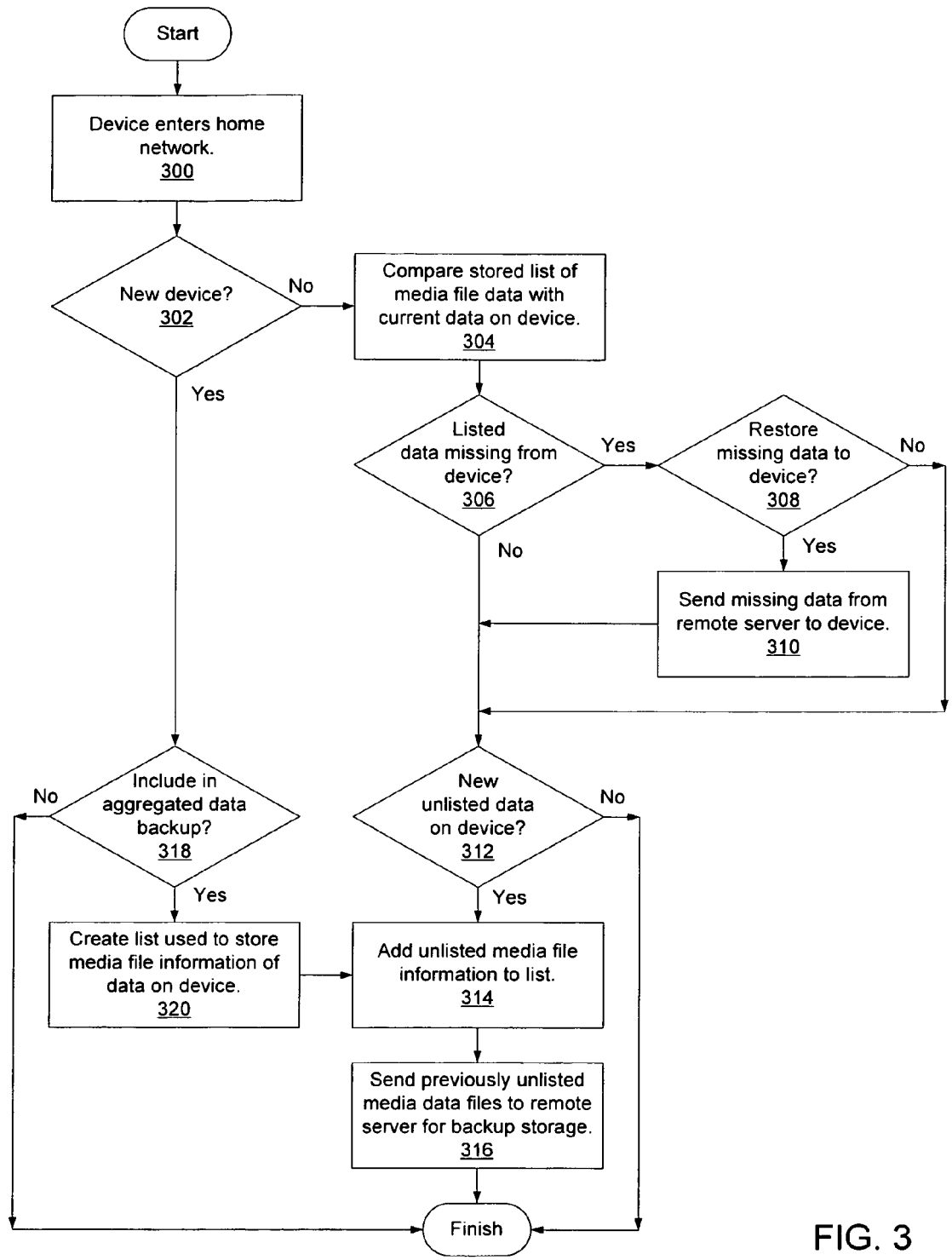
FIG. 3 is a flow diagram of an embodiment of a process to integrate new devices into the media aggregator back up system and restore lost data for devices currently in the system.

FIG. 3 is a flow diagram of an embodiment of a process to integrate new devices into the media aggregator back up system and restore lost data for devices currently in the system. The process is performed by processing logic, which may be hardware, software, or a combination of both hardware and software. The process begins by processing logic determining that a device has entered the home network (processing block 300). The device may have plugged into a wired network or come within range of a wireless network.

Next, processing logic determines whether the device that just entered the network is a new device (processing block 302). If the device is not a new device, then processing logic compares the stored list of media files the media aggregator maintains with the current data on the device (processing block 304). Then processing logic determines whether there is listed data missing from the device (processing block 306).

If there is missing data from the device, processing logic then determines whether to restore the missing data to the device (processing block 308). The media aggregator may prompt the user whether to perform a restore or wait for the user to actively attempt a restore. If it is determined to restore the data to the device, then processing logic contacts the remote server and has the remote server send the missing data to the device (processing block 310). The remote server may either send the data directly to the device or send a stream of data through the media aggregator, which can then direct the stream of missing data to the device.

Then processing logic checks to see if there is new data stored on the device that is not on the list of data stored by the media aggregator (processing block 312). For example, a camera may have entered the network with new pictures that a user just took. If there is no new data, then the process is finished. Otherwise, if there is new data, processing logic adds the unlisted media file information to the list maintained by the media aggregator (processing block 314). Next, processing logic sends the previously unlisted media data files to the remote server for back up storage (processing block 316) and the process is finished. The previously unlisted data may be sent to the remote server immediately or at a later time based on back up event initiation policies.

Returning to block 302, if the device is a new device, the processing logic determines whether to include the device in the aggregated data back up process (processing block 318). For example, a user of the aggregated data back up system may have purchased a new electronic device that stores media files and would like to include the device among the list of devices to back up. Alternatively, the new device may be a guest to the home network and the guest may not want the media aggregator to view or back up any stored files for security and privacy reasons. If processing logic determines to include the device in future aggregated data back up processes, then processing logic creates an entry in the media aggregator's device list for the new device (processing block 320). Then processing logic adds all unlisted media file information in the device to the list maintained by the media aggregator (processing block 314), which in this case would be all file data since the device is new. Next, processing logic sends the previously unlisted media data files to the remote server for back up storage (processing block 316) and the process is finished.

Although the description focuses on embodiments related to a media aggregator as a part of a television media platform, the description should not be limited to this embodiment. For example, in other embodiments, the media aggregator may be a separate device coupled to the home network that is not attached to any particular platform.

Additionally, even though the files to be backed up were generally described as media-based files (such as video and audio files), the media aggregator may assist in backing up any type of file such as pure text files, executable, and files of any other file extension that are allowed to be backed up. In some embodiments, the media aggregator may not allow the backup of certain media files due to digital rights management issues. In these embodiments, the media aggregator may contact a digital rights management server or other knowledge base to determine which files should be denied back up privileges.

Furthermore, although references were made throughout the description to a "home" network, any other environment network may be applicable, such as a business network or a retail establishment's network.

Thus, embodiments of an apparatus and method to provide aggregated backup services for one or more media storage devices have been disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive Hsense.

What is claimed is:

1. A method, comprising:
    a media aggregation device dynamically determining when a first wireless device enters a range of a home wireless network;
    the media aggregation device dynamically determining whether the first wireless device is new to the home wireless network; and
    when the first wireless device is new to the home wireless network,
    the media aggregation device dynamically determining whether to include an amount of data stored in the first wireless device in an aggregated network data backup, and
    when the amount of data stored in the first wireless device is to be stored in the aggregated network data backup, the media aggregation device dynamically creating a first list used to track an amount of media file information pertaining to at least a portion of the amount of data stored on the first wireless device.

2. The method of claim 1, further comprising:
    when the first wireless device is not new to the home wireless network, the media aggregation device dynamically comparing a stored list of media file data to a current list of media file data pertaining to the amount of data stored on the device; and
    when the stored list of media file data does not equal the current list of media file data, the media aggregation device dynamically determining whether to restore any data to the wireless device corresponding to media file data in the stored list that is not currently present on the wireless device.

3. The method of claim 1, further comprising:
    when the first wireless device is not new to the home wireless network, the media aggregation device dynamically comparing a stored list of media file data to a current list of media file data pertaining to the amount of data stored on the device; and
    when the stored list of media file data does not equal the current list of media file data, the media aggregation device dynamically determining whether to add unlisted media file information to the stored list corresponding to media file data present on the wireless device that is not currently present in the stored list.

4. The method of claim 1, comprising:
    the first wireless device sending the amount of data stored in the first wireless device for backup to the media aggregation backup unit; and
    the media aggregation backup unit sending the amount of data stored in the first wireless device to a remote server.

5. The method of claim 4, comprising streaming the amount of data stored in the first wireless device sent for backup from the one or more media storage devices through a widget within a framework of a television media center to the remote server.

6. The method of claim 1, comprising:
    receiving a request to perform a backup media file information tracked by the first list;
    send information to identify the amount of data stored in the first wireless device to a remote server;
    send information to identify the remote server to the first wireless device; and
    backing up the amount of data stored in the first wireless device on the remote server.

7. The method of claim 6, wherein backing up the amount of data stored in the first wireless device comprises the first wireless device sending the amount of data stored in the first wireless device to the remote server.

8. The method of claim 6 wherein backing up the amount of data stored in the first wireless device comprises the media aggregation backup sending the amount of data stored in the first wireless device to the remote server.

9. A computer system, comprising:
    a processor;
    a memory, comprising instructions configured to cause the processor to:
    dynamically determine when a first wireless device enters a range of a home wireless network;
    dynamically determine that the first wireless device is new to the home wireless network;
    dynamically determine to include an amount of data stored in the first wireless device in an aggregated network data backup;
    dynamically create a first list to track an amount of media file information pertaining to at least a portion of the amount of data stored on the first wireless device; and
    backup the amount of media file information in the aggregated network data backup in response to a request from an aggregated media backup unit.

10. The computer system of claim 9, wherein the memory comprises instructions configured to cause the processor to:
    dynamically compares the first list to a current list of media file data associated with the amount of data stored on the first wireless device; and
    dynamically determining to restore data to the first wireless device corresponding to media file data in the current list that is not currently present on the first wireless device.

11. The computer system of claim 9, wherein the memory comprises instructions configured to cause the processor to:
    dynamically compare the first list to a current list of media file data associated with the amount of data stored on the first wireless device; and
    dynamically determine to add media file information to the stored list, wherein the media file information corresponds to media file data present on the first wireless device that is not currently present in the stored list.

12. The computer system of claim 9, wherein the memory comprises instructions configured to cause the processor to:
    send the amount of data stored in the first wireless device for backup to the media aggregation backup unit; and send the amount of data stored in the first wireless device from the media aggregation backup unit to a remote server.

13. The computer system of claim 12, wherein the memory comprises instructions configured to cause the processor to stream the amount of data stored in the first wireless device from the one or more media storage devices through a widget within a framework of a television media center to the remote server.

14. The computer system of claim 9, wherein the memory comprises instructions configured to cause the processor to: prompt one or more users of the media aggregation backup unit to specify whether the first wireless device is included in a backup on the media aggregation backup unit.

15. The computer system of claim 9, wherein the memory comprises instructions configured to cause the processor to:
receive a request to perform a backup media file information tracked by the first list;
send information to identify the amount of data stored in the first wireless device to a remote server;
send information to identify the remote server to the first wireless device; and
backing up the amount of data stored in the first wireless device on the remote server.

16. The computer system of claim 15, wherein the instructions configured to cause the processor to back up the amount of data stored in the first wireless device comprise instructions configured to cause the processor to send the amount of data stored in the first wireless device to the remote server from the first wireless device.

17. The computer system of claim 15, wherein the instructions configured to cause the processor to back up the amount of data stored in the first wireless device comprise instructions configured to cause the processor to send the amount of data stored in the first wireless device from the media aggregation backup to the remote server.

18. A tangible, non-transitory, machine-readable medium that stores machine-readable instructions executable by a processor, the tangible, non-transitory, machine-readable medium comprising:
machine-readable instructions that, when executed by the processor, dynamically determine when a first wireless device enters a range of a home wireless network;
machine-readable instructions that, when executed by the processor, dynamically determine that the first wireless device is new to the home wireless network;
machine-readable instructions that, when executed by the processor, dynamically determine to include an amount of data stored in the first wireless device in an aggregated network data backup;
machine-readable instructions that, when executed by the processor, dynamically create a first list to track an amount of media file information pertaining to at least a portion of the amount of data stored on the first wireless device;
machine-readable instructions that, when executed by the processor, receive a request to perform a backup one or more media storage devices coupled to the home wireless network, wherein the one or more media storage devices comprise the first wireless device;
machine-readable instructions that, when executed by the processor, send information to identify the amount of data stored in the first wireless device to a remote server;
machine-readable instructions that, when executed by the processor, send information to identify the remote server to the first wireless device; and
machine-readable instructions that, when executed by the processor, backup the amount of data stored in the first wireless device on the remote server.

19. The tangible, non-transitory, machine-readable medium of claim 18, wherein the machine-readable instructions that backup the amount of data stored in the first wireless device comprise machine-readable instructions that, when executed by the processor send the amount of data stored in the first wireless device to the remote server from the first wireless device.

20. The tangible, non-transitory, machine-readable medium of claim 18, wherein the machine-readable instructions that backup the amount of data stored in the first wireless device comprise machine-readable instructions that, when executed by the processor send the amount of data stored in the first wireless device from the media aggregation backup to the remote server.

* * * * *